United States Patent
Chuang

(10) Patent No.: US 10,118,496 B2
(45) Date of Patent: Nov. 6, 2018

(54) WATERPROOFING MEMBERS INTEGRALLY FORMED WITH ELEMENTS OF A CHARGING COUPLER

(71) Applicant: Dragon Bite Industrial Co., Ltd., Tainan (TW)

(72) Inventor: Li-Jen Chuang, Tainan (TW)

(73) Assignee: Dragon Bite Industrial Co., Ltd., Tainan (TW)

( * ) Notice: Subject to any disclaimer, the term of this patent is extended or adjusted under 35 U.S.C. 154(b) by 415 days.

(21) Appl. No.: 15/015,170

(22) Filed: Feb. 4, 2016

(65) Prior Publication Data

US 2017/0225577 A1    Aug. 10, 2017

(51) Int. Cl.
*H01R 13/52* (2006.01)
*B60L 11/18* (2006.01)
*H02J 7/00* (2006.01)

(52) U.S. Cl.
CPC ...... *B60L 11/1818* (2013.01); *H01R 13/5219* (2013.01); *H02J 7/0029* (2013.01)

(58) Field of Classification Search
CPC ........ H01R 12/72; H01R 11/09; H01R 9/091; H01R 12/52; H01R 12/714; H01R 13/652; H01R 13/6596; H01R 23/72; H01R 13/52; H01R 13/5205; H01R 13/521; H01R 13/5219; B60L 11/1818; H01J 7/0029
USPC ................................ 439/271–275, 278, 587
See application file for complete search history.

(56) References Cited

U.S. PATENT DOCUMENTS

| | | | | |
|---|---|---|---|---|
| 7,811,115 B1* | 10/2010 | Tyler | ...................... | H01R 13/53 439/352 |
| 8,678,845 B2* | 3/2014 | Osawa | ................. | H01R 13/502 439/352 |
| 8,678,847 B2* | 3/2014 | Inoue | .................. | B60L 11/1818 439/352 |
| 8,727,799 B2* | 5/2014 | Osawa | ............... | H01R 13/5208 439/275 |
| 9,834,107 B2* | 12/2017 | Ono | .................... | B60L 11/1842 |
| 2011/0281452 A1* | 11/2011 | Kurumizawa | .......... | B60L 11/14 439/304 |
| 2013/0105219 A1* | 5/2013 | Osawa | ............... | H01R 13/5208 174/77 R |
| 2015/0295344 A1* | 10/2015 | Sawada | ............... | B60L 11/1818 439/587 |

* cited by examiner

*Primary Examiner* — Chandrika Prasad
(74) *Attorney, Agent, or Firm* — Alan D. Kamrath; Kamrath IP Lawfirm, P.A.

(57) ABSTRACT

Upon completion of the manufacturing of constituent elements of the charging coupler, waterproof members each with a predetermined shape and width are integrally formed, made from an appropriate material, and disposed at a predetermined portion and/or segment of the constituent elements. In consequence, a hermetic seal is effectuated between each of the constituent elements of the waterproof members and a corresponding one of adjacent related elements of the charging coupler to therefore prevent any gap from forming in the charging coupler after long use, thereby preventing intrusion of ambient moisture.

3 Claims, 5 Drawing Sheets

WATERPROOFING MEMBERS INTEGRALLY FORMED WITH ELEMENTS OF A CHARGING COUPLER

BACKGROUND OF THE INVENTION

1. Technical Field

The present invention relates to waterproof mechanisms of charging couplers and, more particularly, to a waterproof mechanism of a charging coupler. Upon completion of the manufacturing of constituent elements of the charging coupler, waterproof members each with a predetermined shape and width are integrally fainted, made from an appropriate material, and disposed at a predetermined portion and/or segment of the constituent elements. In consequence, a hermetic seal is effectuated between each of the constituent elements which the waterproof members are coupled to and a corresponding one of adjacent related elements of the charging coupler to therefore prevent any gap from forming in the charging coupler after long use, thereby preventing intrusion of ambient moisture.

2. Description of Prior Art

Conventional charging couplers for use with electric vehicles, hybrid electric vehicles, and electric cars exhibit great diversity in shape. Basically, the conventional charging couplers must each have a charging coupler body with a predetermined shape. A charging control unit is disposed at a predetermined segment of the charging coupler body. A press member is disposed on the charging coupler body, positioned proximate to the charging control unit, and adapted to be pressed by a human hand. A charging coupler connection unit is disposed at a rear end of the charging coupler body to effectuate positional engagement in conjunction with a power cable of the charging coupler. A charging end unit is disposed at a front end of the charging coupler body. Therefore, the charging coupler is fit for use in charging electric vehicles, hybrid electric vehicles, and electric cars.

To charge an electric vehicle, hybrid electric vehicle, or electric car with the charging coupler, it is necessary to open a lid which covers a charging port of the vehicle/car, insert the charging end unit in front of the charging coupler into the charging port of the vehicle/car, insert a charging terminal of the charging end unit into an inlet of the charging port, and eventually press a press member of the charging coupler to begin charging the vehicle/car.

To prevent intrusion of ambient moisture and a resultant electrical shock or short circuit, waterproof members are disposed at the peripheral portion of the charging port of the vehicle/car and/or a predetermined portion of exposed elements of the charging coupler. In general, the waterproof members of the charging coupler are formed in a process which is separate from the process of forming related elements, and the waterproof members get coupled to the related elements while the process of putting together charging coupler elements is underway, thereby rendering the charging coupler waterproof.

Given a gap between a waterproof member and a constituent element, the capability of waterproof members of a conventional charging coupler to prevent intrusion of ambient moisture deteriorates after long use of the conventional charging coupler.

Therefore, it is important to overcome a drawback of the prior art, that is, a hermetic seal which is otherwise effectuated between a constituent element which waterproof members are coupled to and an adjacent related element of the charging coupler for use in charging vehicles/cars is likely to vanish after long use. To this end, upon completion of the manufacturing of constituent elements of the charging coupler, waterproof members which related elements inside the charging coupler are coupled to and which each has a predetermined shape, are integrally formed, made from an appropriate material, and disposed at a predetermined portion of the constituent elements, to not only improve the way the waterproof members get engaged with the constituent elements but also ensure that a hermetic seal can be effectuated between each of the waterproof members and a corresponding one of adjacent related elements of the charging coupler.

SUMMARY OF THE INVENTION

In view of a drawback of the prior art, that is, a gap is likely to develop between a waterproof member and a constituent element of a charging coupler for use in charging electric vehicles, hybrid electric vehicles, and electric cars, after long use, it is important to overcome the drawback of the prior art with a solution briefly described as follows: upon completion of the manufacturing of constituent elements of the charging coupler, waterproof members each with a predetermined shape and width are integrally formed, made from an appropriate material, and disposed at a predetermined portion and/or segment of the constituent elements. In consequence, a hermetic seal is effectuated between each of the constituent elements which the waterproof members are coupled to and a corresponding one of adjacent related elements of the charging coupler to therefore prevent any gap from forming in the charging coupler after long use, thereby preventing intrusion of ambient moisture.

It is an objective of the present invention to provide a waterproof mechanism of a charging coupler, with the charging coupler adapted to charge vehicles, comprising a charging coupler body, a charging coupler control unit, a press element, a top end concealment element, a charging coupler connection unit holding therein a lining element at one end, and a charging end unit. Upon completion of the forming process of the elements of the charging end unit and the charging coupler control unit, waterproof members with required shape and width are formed from an appropriate material at a predetermined portion and/or segment of the charging end unit and the charging coupler control unit. In consequence, a hermetic seal is effectuated between each of constituent elements which make up the charging coupler and require prevention of ambient moisture intrusion and a corresponding one of adjacent related elements of the charging coupler to therefore prevent any gap from forming in the charging coupler after long use, thereby preventing intrusion of ambient moisture.

Another objective of the present invention is that one of the waterproof members coupled to the charging end unit is disposed in front of an engagement segment to effectuate an enhanced hermetic seal as soon as the charging coupler body is rotated and thus fastened in place.

Yet another objective of the present invention is that the waterproof members of the charging coupler control unit are disposed at a waist segment centrally located to thereby effectuate a hermetic seal as soon as the charging coupler body gets positional engagement within a predetermined receiving space.

DETAILED DESCRIPTION OF THE EMBODIMENTS OF THE INVENTION

Figure 3:
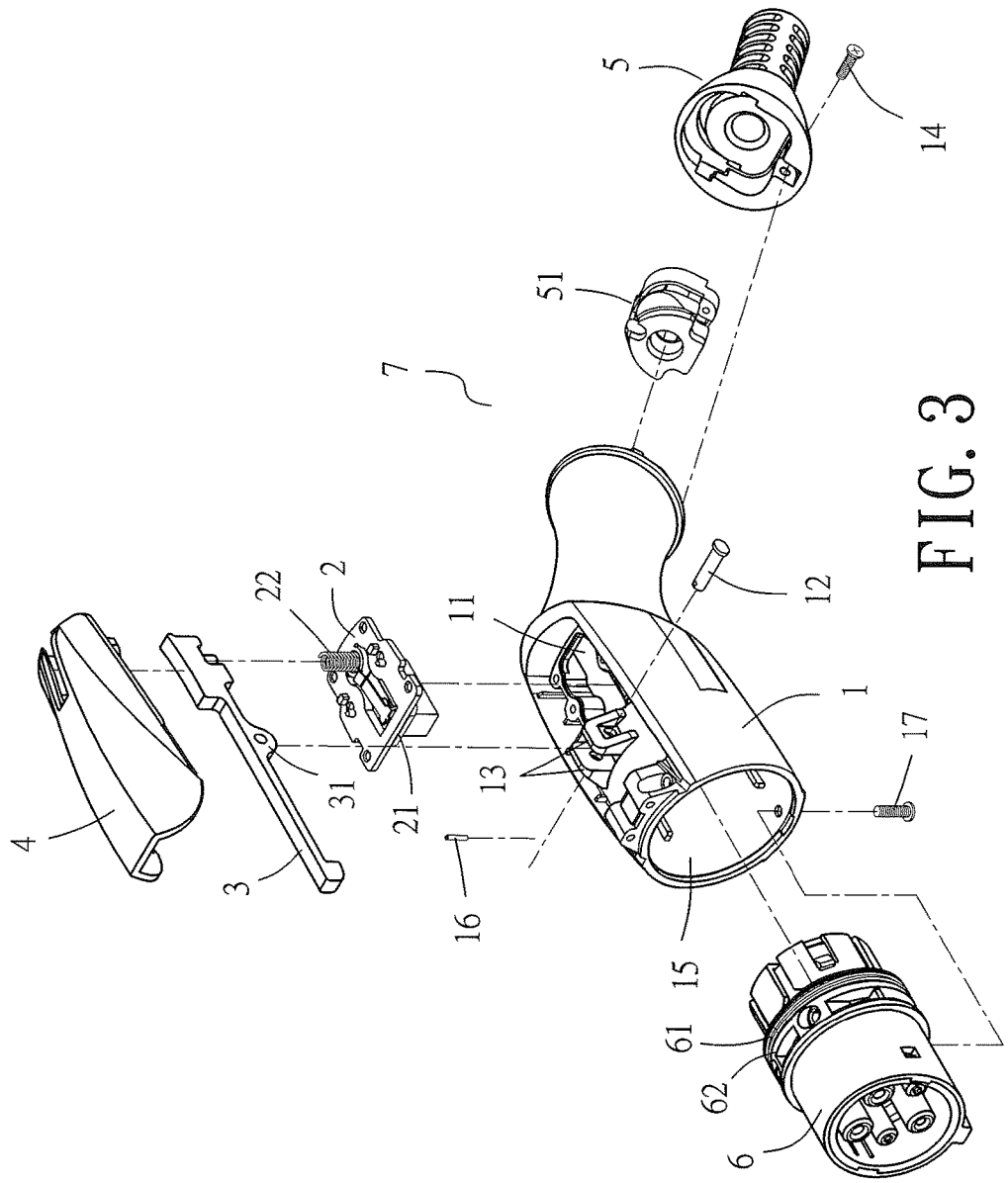
FIG. 3 is an exploded view of the charging coupler according to the preferred embodiment of the present invention.

The present invention provides a waterproof mechanism of a charging coupler (shown in FIG. 3). According to the present invention, a charging coupler 7 for use in charging chargeable vehicles/cars, such as electric vehicles, hybrid electric vehicles, and electric cars, comprises a charging coupler body 1, a charging coupler control unit 2, a press element 3, a top end concealment element 4, a charging coupler connection unit 5 holding therein a lining element 51 at one end, and a charging end unit 6.

The charging coupler body 1, the charging coupler control unit 2, the press element 3, the top end concealment element 4, the charging coupler connection unit 5 holding therein the lining element 51 at one end, and the charging end unit 6 are integrally formed from a predetermined high-mechanical-strength material in a manufacturing process. Waterproof members 21, 61 with required shape and width are coupled to constituent elements of the charging coupler 7 in the situation where the constituent elements require prevention of ambient moisture intrusion. To preclude the intrusion of ambient moisture through the charging end unit 6 exposed at the front end and the charging coupler control unit 2 disposed at an upper end of the charging coupler body 1, the charging coupler 7 is characterized in that the waterproof members 61, 21 are coupled to a predetermined portion and/or segment of the charging end unit 6 and the charging coupler control unit 2, respectively.

Figure 2:
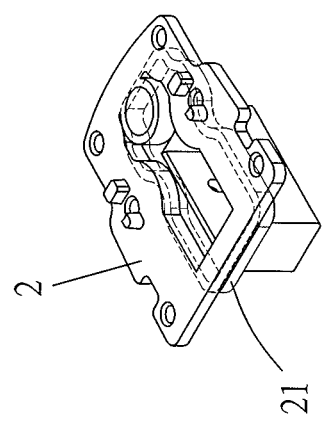
FIG. 2 is another schematic view of the charging coupler according to the preferred embodiment of the present invention.
Figure 1:
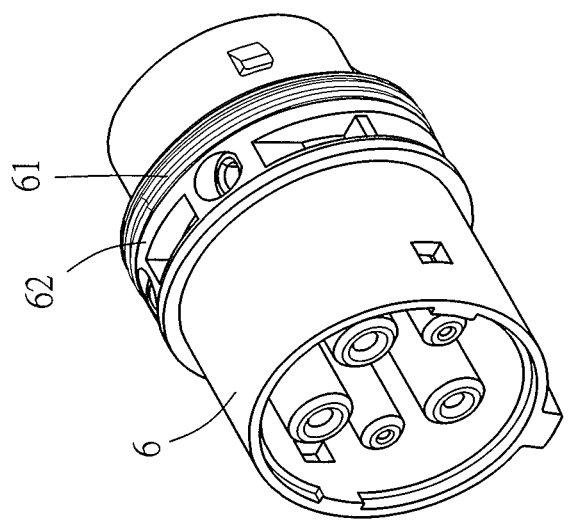
FIG. 1 is a schematic view of a charging coupler according to a preferred embodiment of the present invention.
Figure 6:
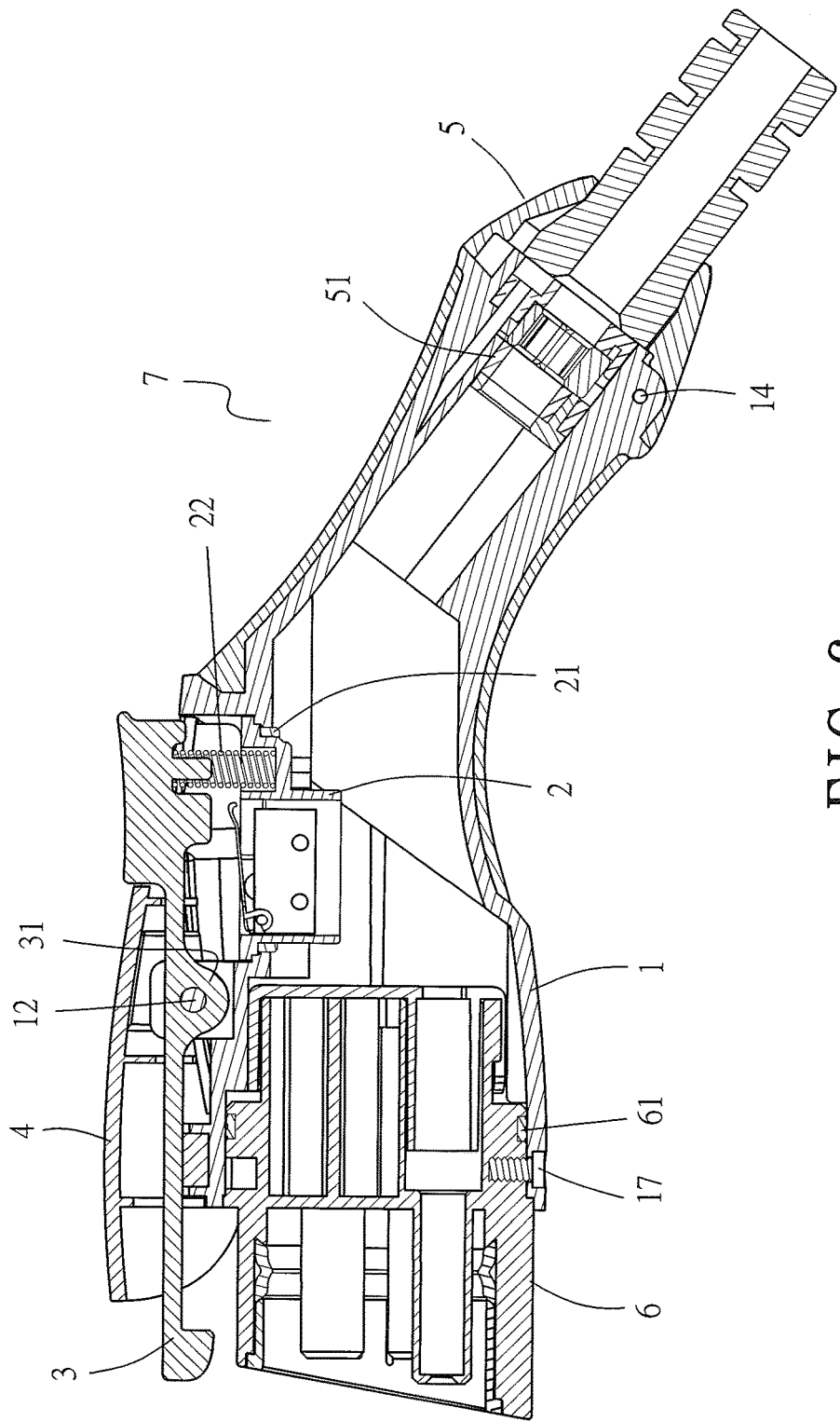
FIG. 6 is a cross-sectional view of the charging coupler taken along line 60-60 of FIG. 5 according to the preferred embodiment of the present invention.

According to the present invention, coupling the waterproof members 21, 61 to the constituent elements which require prevention of ambient moisture intrusion entails performing a process as follows: upon completion of the forming process of the elements of the charging end unit 6 and the charging coupler control unit 2, waterproof members 61, 21 (shown in FIG. 1, FIG. 2) with required shape and width are formed from an appropriate material at a predetermined portion and/or segment of the charging end unit 6 and the charging coupler control unit 2. The waterproof member 61 coupled to the charging end unit 6 is disposed in front of an engagement segment 62 to effectuate an enhanced hermetic seal as soon as the charging coupler body 1 is rotated and thus fastened in place (shown in FIG. 6). The waterproof member 21 of the charging coupler control unit 2 is disposed at a waist segment (shown in FIG. 2) centrally located to thereby effectuate a hermetic seal as soon as the charging coupler body 1 gets positional engagement within a predetermined receiving space 11 (shown in FIG. 6).

Figure 4:
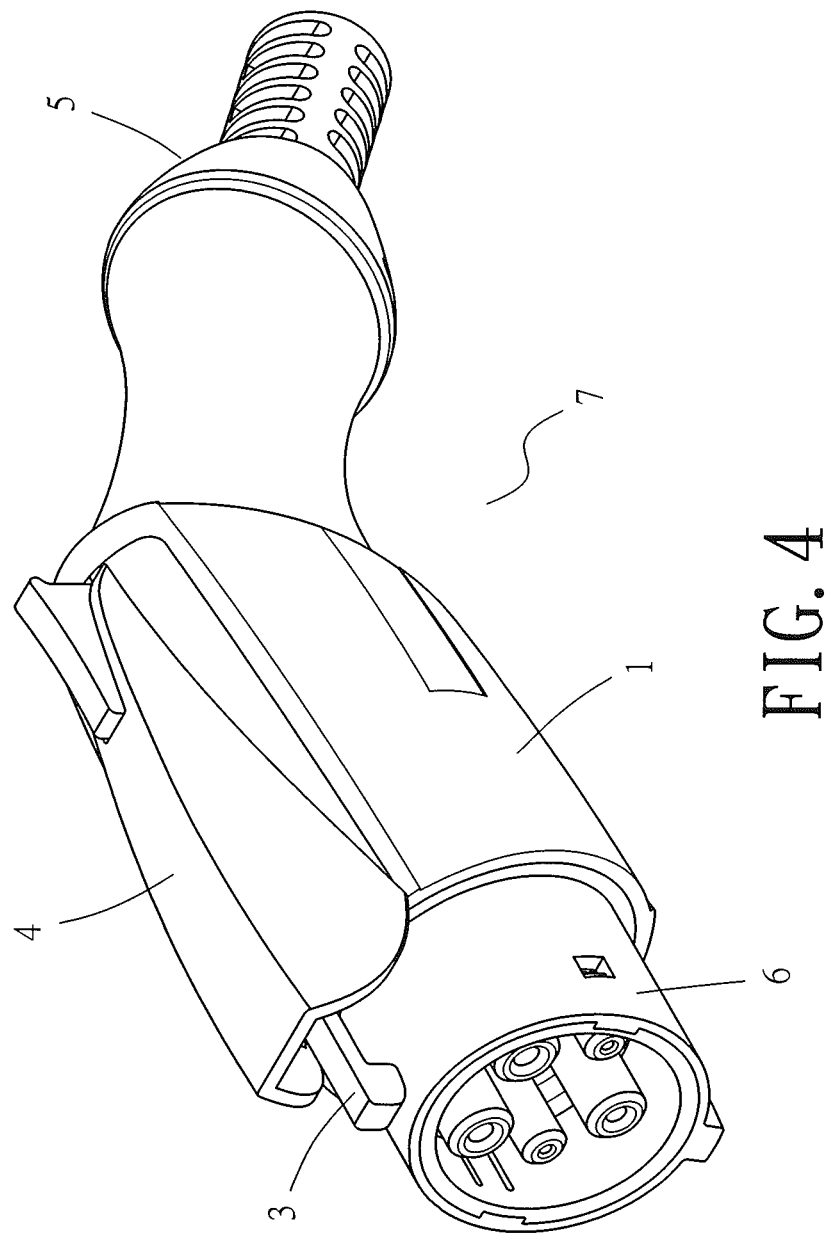
FIG. 4 is a perspective view of the charging coupler according to the preferred embodiment of the present invention.
Figure 5:
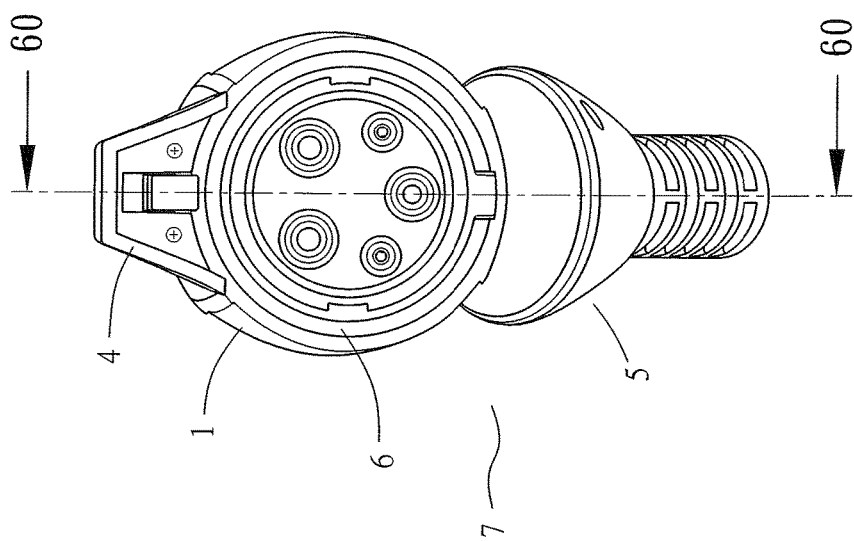
FIG. 5 is a front view of the charging coupler according to the preferred embodiment of the present invention.

The charging coupler body 1, the charging coupler control unit 2, the press element 3, the top end concealment element 4, the charging coupler connection unit 5 holding therein the lining element 51 at one end, and the charging end unit 6 are implemented (shown in FIG. 6) by inserting the charging coupler control unit 2 into the predetermined receiving space 11 disposed at the upper end of the charging coupler body 1, connecting a spring 22 to an upper end of the charging coupler control unit 2, allowing the other end of the spring 22 to abut against the press element 3, passing two lugs 31 extending from the middle segment of the press element 3 through two support portions 13 of the charging coupler body 1 by a pin 12, respectively, allowing the press element 3 to pivotally connect with the charging coupler body 1 upon introduction of the two lugs 31, allowing the top end concealment element 4 to engage with the upper end portion of the charging coupler body 1, inserting the charging coupler connection unit 5 holding therein the lining element 51 at one end into a terminal end of the charging coupler body 1, effectuating positional limitation with a screwing element 14, inserting the charging end unit 6 directly into a front end opening 15 of the charging coupler body 1, and effectuating positional limitation with a pin 16 and a screwing element 17, to finalize the assembly of the charging coupler 7 (shown in FIG. 4, FIG. 5).

The charging end unit 6 and the charging coupler control unit 2 of the waterproof members 61, 21 are coupled to the charging coupler 7. Since the charging end unit 6 and the charging coupler control unit 2 are directly formed from a required material at a predetermined portion and/or segment of the charging coupler 7 during the process of forming the constituent elements, a hermetic seal is effectuated as soon as the constituent elements (i.e., the charging end unit 6 and the charging coupler control unit 2) which require prevention of ambient moisture intrusion come into contact with adjacent related elements (i.e., the charging coupler body 1), to prevent any gap from forming in the charging coupler 7 after long use, thereby preventing intrusion of ambient moisture.

What is claimed is:

1. A waterproof mechanism of a charging coupler, with the charging coupler adapted to charge vehicles, comprising constituent elements comprising a charging coupler body, a charging coupler control unit disposed on an upper side of the charging coupler body, a press element pivotally connected to the charging coupler body, and a top end concealment element engaged with an upper end portion of the charging coupler body, wherein a lining element and a charging coupler connection unit are inserted sequentially into a terminal end of the charging coupler body, wherein a charging end unit is inserted into a front end of the charging coupler body, wherein waterproof members with a required shape and width are integrally formed at a predetermined portion or segment of the charging end unit and the charging coupler control unit and are made from an appropriate material; and wherein the constituent elements of the charging coupler, which require ambient moisture intrusion prevention, are in tight contact with adjacent constituent elements.

2. The waterproof mechanism of a charging coupler according to claim 1, wherein one of the waterproof members coupled to the charging end unit is disposed in front of an engagement segment to effectuate an enhanced hermetic seal as soon as the charging coupler body is rotated and thus fastened in place.

3. The waterproof mechanism of a charging coupler according to claim 1, wherein another one of the waterproof members of the charging coupler control unit is disposed at a waist segment centrally located to effectuate a hermetic seal as soon as the charging coupler body gets positional engagement within a predetermined receiving space.

* * * * *